US012344365B1

(12) United States Patent
Bohorquez et al.

(10) Patent No.: US 12,344,365 B1
(45) Date of Patent: Jul. 1, 2025

(54) ELECTRIC PROPULSOR WITH FOLDING PROPELLER

(71) Applicant: THE BOEING COMPANY, Arlington, VA (US)

(72) Inventors: Felipe Bohorquez, Cambridge, MA (US); Francesco Giannini, Falls Church, VA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/648,157

(22) Filed: Apr. 26, 2024

(51) Int. Cl.
  *B64C 27/50* (2006.01)
  *B64C 11/28* (2006.01)
  *B64C 27/54* (2006.01)

(52) U.S. Cl.
  CPC .............. *B64C 11/28* (2013.01); *B64C 27/50* (2013.01); *B64C 27/54* (2013.01)

(58) Field of Classification Search
  CPC .......... B64C 11/28; B64C 27/50; B64C 27/54
  See application file for complete search history.

(56) References Cited

U.S. PATENT DOCUMENTS

| 3,187,818 | A | * | 6/1965 | Barrett | .................... B64C 27/50 |
| | | | | | 416/142 |
| 2021/0309351 | A1 | | 10/2021 | Giannini | |
| 2021/0403143 | A1 | * | 12/2021 | Alley | ..................... B64U 50/13 |
| 2023/0348088 | A1 | * | 11/2023 | Besse | ..................... B64C 11/28 |

\* cited by examiner

*Primary Examiner* — Elton K Wong
*Assistant Examiner* — Theodore C Ribadeneyra
(74) *Attorney, Agent, or Firm* — Hanley, Flight & Zimmerman, LLC

(57) ABSTRACT

The present disclosure provides an electric propulsor. The electric propulsor has a propeller having a hub and blades extending from the hub. The blades are movable along respective flapping axes between a deployed position and a stowed position. The electric propulsor also has an actuator and an electric motor coupled with the hub and arranged to rotatably drive the propeller. Further, the electric propulsor has one or more processors configured to: receive an input indicating an azimuthal position of the blades; control the electric motor to align the blades with a target azimuthal position based at least in part on the input; and with the blades of the propeller arranged at the target azimuthal position, cause the actuator to translate a control rod coupled thereto and with the hub to actively fold or unfold the blades along the respective flapping axes of the blades.

20 Claims, 11 Drawing Sheets

ELECTRIC PROPULSOR WITH FOLDING PROPELLER

FIELD

Aspects of the present disclosure relate to an electric propulsor equipped with a folding propeller.

BACKGROUND

Some aircraft can include one or more electric propulsors that each have a propeller driven by an electric motor. A propeller of an electric propulsor can have foldable propellers that can be deployed and rotated to produce thrust and/or lift or folded to a retracted or stowed position when not in use. Conventionally, blades have been passively folded under an aerodynamic load and passively deployed using centrifugal forces. To allow the blades to deploy and fold without interference, such passive designs have required the propeller to be mounted far enough away from nearby aircraft structures. For example, for wing-mounted electric propulsors, a nacelle and motor mount must extend forward of the wing by an amount corresponding to the propeller radius at a minimum. For large propellers, this results in long and heavy nacelle structures, which must be particularly strong to contend with vibrations generated by unsteady operation of the propeller.

SUMMARY

The present disclosure provides an electric propulsor in one aspect. The electric propulsor includes a propeller having a hub and blades extending from the hub, the blades being movable along respective flapping axes between a deployed position and a stowed position. The electric propulsor also includes a motor coupled with the hub and arranged to rotatably drive the propeller. The electric propulsor further includes an actuator. Also, the electric propulsor includes one or more processors and one or more non-transitory memory devices storing instructions, which, when executed by any combination of the one or more processors, causes the one or more processors to perform an operation. The operation includes receiving an input indicating an azimuthal position of the blades; controlling the motor to align the blades with a target azimuthal position based at least in part on the input; and with the blades of the propeller arranged at the target azimuthal position, causing the actuator to translate a control rod coupled thereto and with the hub to actively fold or unfold the blades along the respective flapping axes of the blades.

In one aspect, in combination with any example electric propulsor above or below, the control rod has, or is coupled with, a clevis having opposing arms that each define complementary slots.

In one aspect, in combination with any example electric propulsor above or below, the actuator has a control arm that is received between the opposing arms and that has a pin slidably received within the complementary slots.

In one aspect, in combination with any example electric propulsor above or below, to move the blades to the stowed position, the operation includes: with the blades of the propeller arranged at the target azimuthal position, causing the control arm of the actuator to retract so that the pin engages respective ends of the complementary slots to pull the clevis toward an actuator housing of the actuator in which the control arm retracts, which causes the blades to actively fold along the respective flapping axes to the stowed position.

In one aspect, in combination with any example electric propulsor above or below, to move the blades from the stowed position to the deployed position, the operation includes: with the blades of the propeller arranged at the target azimuthal position, causing the control arm of the actuator to extend so that the clevis is moved away from an actuator housing of the actuator from which the control arm extends, which causes the blades to actively unfold along the respective flapping axes.

In one aspect, in combination with any example electric propulsor above or below, in causing the control arm of the actuator to extend so that the clevis is moved away from the actuator housing, the blades are actively unfolded along the respective flapping axes so that the blades reach a position in which the blades have respective negative coning angles, and wherein the operation further includes: rotating the motor to move the blades from the position in which the blades have respective negative coning angles to the deployed position in which the blades reach an equilibrium position.

In one aspect, in combination with any example electric propulsor above or below, as the blades reach and operate in the equilibrium position, the actuator is not loaded during rotation of the blades.

In one aspect, in combination with any example electric propulsor above or below, the electric propulsor further includes a mounting frame having a hinge coupling the actuator to the mounting frame. The electric propulsor also includes a clevis guide rail mounted to the mounting frame in which the clevis is translatable.

In one aspect, in combination with any example electric propulsor above or below, the hub has a static spider and a sliding spider connected by linkages, the control rod is coupled with the sliding spider by way of a de-spinner that allows the sliding spider to rotate relative to the control rod, which is non-rotating, and wherein the sliding spider is translatable relative to the static spider by translation of the control rod so as to cause the blades to fold or unfold along the respective flapping axes.

In one aspect, in combination with any example electric propulsor above or below, the linkages include, for each one of the blades, a blade root linkage and a connector linkage, the blade root linkage is arranged to hold one of the blades and is pivotably coupled with the static spider and is also coupled with the sliding spider by way of the connector linkage, and wherein the blade root linkages holding respective ones of the blades have hinges defining the respective flapping axes of the blades.

In one aspect, in combination with any example electric propulsor above or below, the electric propulsor further includes a mounting frame coupling the electric propulsor with a vehicle structure, and the target azimuthal position is an azimuthal position in which the blades, when folded or unfolded, do not contact the vehicle structure.

In one aspect, in combination with any example electric propulsor above or below, the electric propulsor further includes a mounting frame coupling the electric propulsor with a wing of an aircraft, the aircraft defining a longitudinal direction, and wherein, when the blades are in the stowed position, the blades overlap with the wing along the longitudinal direction.

In one aspect, in combination with any example electric propulsor above or below, the control rod has a first end and a second end and extends through a hollow shaft of motor, and wherein the first end is coupled with the hub on a first side of the motor and the second end is coupled with the actuator on a second side of the motor that is opposite the first side.

The present disclosure provides a method in another aspect. The method includes receiving an input indicating an azimuthal position of blades of a propeller; aligning the blades with a target azimuthal position based at least in part on the input; and with the blades of the propeller arranged at the target azimuthal position, causing an actuator to translate a control rod coupled thereto and with a hub of the propeller to actively fold or unfold the blades along respective flapping axes of the blades.

In one aspect, in combination with any example method above or below, the control rod has, or is coupled with, a clevis having opposing arms that each define complementary slots.

In one aspect, in combination with any example method above or below, the actuator has a control arm that is received between the opposing arms and that has a pin slidably received within the complementary slots.

In one aspect, in combination with any example method above or below, actively folding the blades along respective flapping axes to the stowed position includes: with the blades of the propeller arranged at the target azimuthal position, retracting the control arm of the actuator so that the pin engages respective ends of the complementary slots to pull the clevis toward an actuator housing of the actuator in which the control arm retracts, which causes the blades to actively fold along the respective flapping axes to the stowed position.

In one aspect, in combination with any example method above or below, actively unfolding the blades along respective flapping axes includes: with the blades of the propeller arranged at the target azimuthal position, extending the control arm of the actuator so that the clevis is moved away from an actuator housing of the actuator from which the control arm extends, which causes the blades to actively unfold along the respective flapping axes.

In one aspect, in combination with any example method above or below, in extending the control arm of the actuator so that the clevis is moved away from the actuator housing, the blades are actively unfolded along the respective flapping axes so that the blades reach a position in which the blades have respective negative coning angles, and wherein the method further includes: rotating a motor coupled with the propeller to move the blades from the position in which the blades have respective negative coning angles to the deployed position in which the blades reach an equilibrium position.

The present disclosure provides a non-transitory computer readable medium in yet another aspect. The non-transitory computer readable medium stores instructions, which, when executed by any combination of one or more processors, causes the one or more processors to perform an operation. The operation includes receiving an input indicating an azimuthal position of blades of a propeller; controlling a motor coupled with the propeller to align the blades with a target azimuthal position based at least in part on the input; and with the blades of the propeller arranged at the target azimuthal position, causing an actuator to translate a control rod coupled thereto and with a hub of the propeller to actively fold or unfold the blades along respective flapping axes of the blades.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
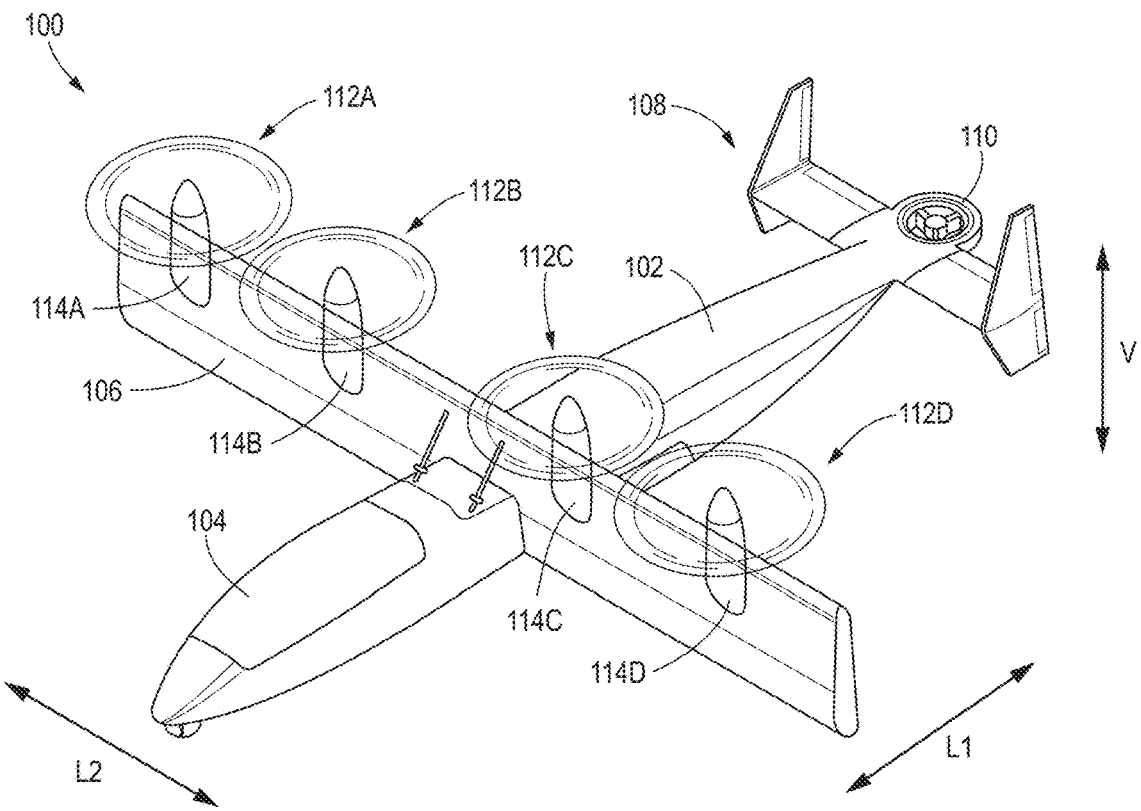
FIGS. 1 and 2 illustrate an example aircraft in accordance with aspects of the present disclosure during vertical and horizontal operations, respectively.

The present disclosure provides an electric propulsor equipped with features that enable the safe and active folding and unfolding of blades of a propeller of the electric propulsor along their respective flapping axes. The blades can be moved between a stowed position (or retracted position) and a deployed position in which the blades can rotate to produce and/or lift.

In one example aspect, an electric propulsor can include a propeller having a hub and a plurality of foldable blades extending from the hub. The propeller can be rotatably-driven by an electric motor mechanically coupled thereto. The electric propulsor can further include an actuator mounted in a non-rotating mounting frame for enabling the blades to fold or unfold. The actuator can translate a control rod coupled with a linkage arrangement within the hub to move the blades. These features allow the propeller to work as an articulated rotor, with flapping and lead lag hinges, reducing the hub loads. Beneficially, due to the mechanical architecture and actuation control schemes disclosed herein, no electric power to the actuator may be needed when the blades are in the stowed or deployed positions. Further, folding and unfolding of the blades can be independent of the electric motor rotation, which allows for the electric motor to align the blades with a target azimuthal position using closed-loop feedback so that the blades can be folded or unfolded without striking nearby structures. Advantageously, this allows for an electric propulsor to be installed in positions on the airframe not available to conventional electric propulsors. In some exemplary unfolding or deployment operations, with the blades aligned with a target azimuthal position, the blades can be unfolded, and only then allowed to spin. This process can avoid interference of the blades with nearby structures. Similarly, in some exemplary folding operations, the blades can be stopped, rotated to a target azimuthal position, and then folded. This process can likewise avoid interference of the blades with nearby structures. The electric propulsor of the present disclosure includes mechanical architecture and corresponding control to perform such deployment and folding operations for propellers that can be used for propulsive and/or lift purposes.

The electric propulsor disclosed herein can provide one or more advantages, benefits, and/or technical effects, e.g., in addition to the ones noted above. For instance, the foldable blades of the electric propulsor disclosed herein can be folded and unfolded independent of external aerodynamic forces and rotation. In this regard, the folding and unfolding of the blades is decoupled from the propeller rotation. Further, the foldable blades of the electric propulsor disclosed herein can be folded at a specified or target azimuthal position, clearing obstacles like nearby structures. This allows the propeller of the electric propulsor disclosed herein to be mounted closer to a mounting surface (e.g., a wing) than propellers of conventional electric propulsors.

In addition, the mechanical architecture of the electric propulsor disclosed herein can allow for folded blades to be locked in position, avoiding accidental deployment, and allows for independent flapping of the blades without introducing large bending moments on the hub or electric motor when exposed to cross flow. The mechanical architecture can thus minimize vibrations and allow the blades to reach an equilibrium position when deployed. Also, a lead-lag hinge allows the blades to move freely in a plane of rotation, minimizing hub loads and vibration transferred to the electric motor and frame. Further, the mechanical architecture of the electric propulsor disclosed herein can have a reduced rotational inertia compared to conventional designs, which allows the electric propulsor to be utilized on multicopter systems that rely on propeller RPM for control. Also, the mechanical architecture of the electric propulsor disclosed herein, and specifically the linkage arrangement within the hub, can be accommodated within an interior volume of a spinner of the hub to minimize aerodynamic drag. The electric propulsor disclosed herein can also be modular and scalable to propellers with a plurality of blades.

Further, in some aspects, when the foldable propeller is operating in a crossflow, a scenario sometimes expected for applicable vertical take-off and landing vehicles, as the rotor of the electric motor spins, forces can increase the coning angle of the blades to an equilibrium position. A slot in the actuator fulcrum, or slotted clevis to which a control arm of the actuator is coupled by way of a pin received within the slot, avoids loading the actuator when the propeller is spinning. This can provide a "dead zone" where propeller blades find their respective equilibrium positions without loading the actuator. When retracting or folding the blades, the actuator locks the pin in place within the slotted clevis, preventing the stowed blades from flapping.

Figure 2:
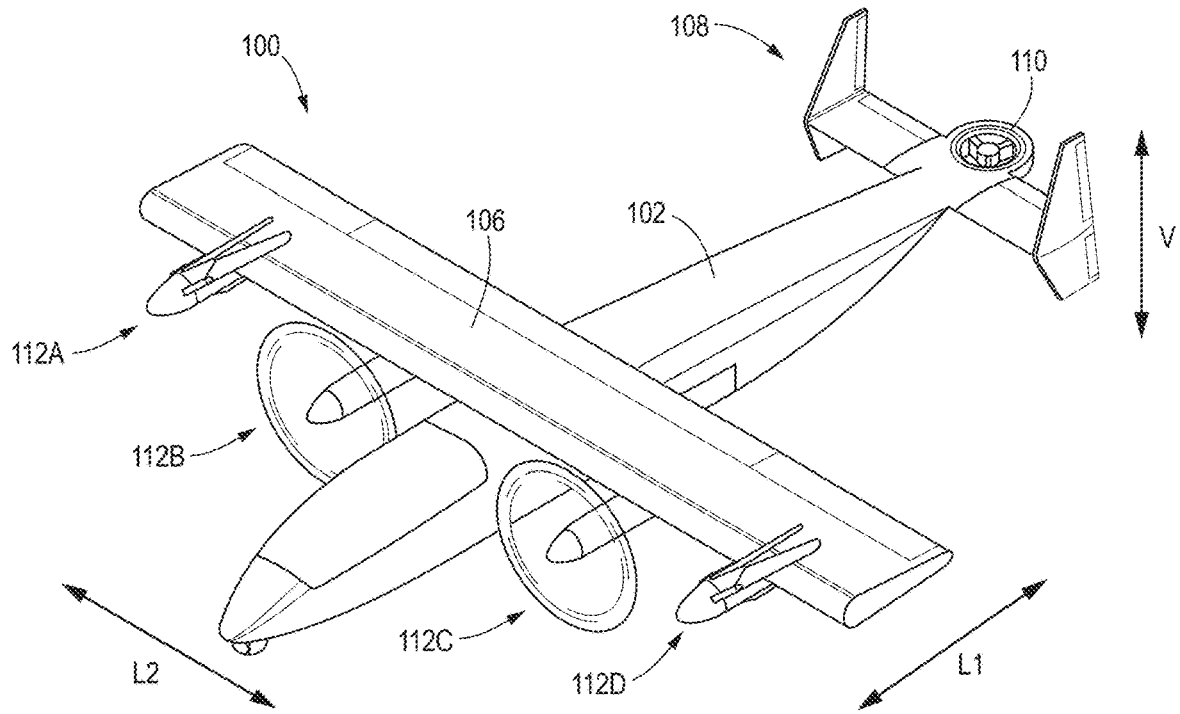

Referring now to the figures, FIGS. 1 and 2 illustrate an aircraft 100 in accordance with example aspects of the present disclosure during vertical and horizontal operation, respectively. The aircraft 100 can be implemented as a vertical takeoff and landing (VTOL) aircraft, a short takeoff and landing (STOL), or a conventional takeoff and landing (CTOL) aircraft, for example. The aspects of the present disclosure can be also be applicable to other aircraft, such as rotorcraft, as well as to other vehicles that utilize propellers, such as watercraft and hovercraft. In FIGS. 1 and 2, the aircraft 100 is implemented as a VTOL aircraft. For reference, the aircraft 100 defines a longitudinal direction L1, a lateral direction L2, and a vertical direction V.

As depicted, the aircraft 100 includes a fuselage 102, a cockpit 104, one or more wings 106 (e.g., a rotatable tilt wing, a rotatable hovering wing, a full width tilt wing, etc.), a tail empennage 108, and a pitch fan 110. In this example, the wing 106 is a tilt wing that can be tilted or moved between a vertical tilt position (FIG. 1) and a horizontal tilt position (FIG. 2). In the vertical tilt position, the wing 106 is oriented generally along the vertical direction V (or generally perpendicular to the ground). In the horizontal tilt position, the wing 106 is oriented generally perpendicular to the vertical direction V (or generally parallel with the ground). The pitch fan 110 can be an electrically-driven fan that facilitates stabilization of the aircraft 100 during hovering or takeoff operations, e.g., by controlling the pitch of the aircraft 100. While the aircraft 100 is manned in this example, the aircraft 100 can alternatively be implemented as an unmanned aerial vehicle (UAV), an autonomous aerial vehicle, or a semi-autonomous aerial vehicle.

The aircraft 100 also includes a propulsion system having a plurality of propulsors. In this example, the aircraft 100 includes propulsors 112A, 112B, 112C, 112D. The propulsors 112A, 112B, 112C, 112D are each mounted to the wing 106 with the propulsors 112A, 112B being mounted on the starboard side of the fuselage 102 and the propulsors 112C, 112D being mounted on the port side of the fuselage 102. The propulsors 112B, 112C are each mounted to the wing 106 inboard of their neighboring propulsors 112A, 112D. In this regard, propulsors 112B, 112C are inboard propulsors and propulsors 112A, 112D are outboard propulsors. The propulsors 112A, 112B, 112C, 112D can each include respective nacelles 114A, 114B, 114C, 114D. In alternative aspects, the propulsors 112A, 112B, 112C, 112D can have alternative mounting locations, such as to the fuselage 102, at or near the tail empennage 108, etc.

The propulsors 112B, 112C can include a propeller and can be electrically-driven by an electric motor or can be gas-powered, e.g., by a gas turbine engine mechanically coupled thereto. The propulsors 112A, 112D can each include a propeller and an electric motor. The electric motors can rotatably drive their associated propellers. The nacelles 114A, 114D can cover the electric motors as well as other components of the propulsors 112A, 112D. In some aspects, the aircraft 100 can include one or more energy storage devices (e.g., batteries, super capacitors, etc.) for storing electrical energy. Electrical power can be supplied to, among other components, the electric motors of the electric propulsors 112A, 112D by way of a power bus. One or more power converters can be arranged along the power bus to control the supply of electrical power to the electric motors. In some aspects, the propulsion system can be a fully-electric propulsion system. In other aspects, the propulsion system can be a hybrid-electric propulsion system. In one example hybrid-electric propulsion system, the system can have the propulsors 112A, 112D being arranged to be electrically-driven propulsors with the propulsors 112B, 112C being driven by a gas-powered plant, such as a gas turbine engine coupled with an electrical generator arranged to charge the one or more energy storage devices and to drive the propulsors 112B, 112C. Thrust can be produced by the gas turbine engine as well.

In FIG. 1, the aircraft 100 is operating in a vertical operation (e.g., hovering, vertical takeoff, vertical landing) with the wing 106 tilted to the vertical tilt position and the propulsors 112A, 112B, 112C, 112D deployed and rotating to produce lift for the aircraft 100. The pitch fan 110 can be activated to stabilize the pitch of the aircraft 100 during vertical operation. To transition to horizontal operation (e.g., cruise operation), the wing 106 can be tilted or moved to the horizontal tilt position with the propulsors 112A, 112B, 112C, 112D still deployed and rotating to produce thrust. Thereafter, in some instances, blades of one or more of the propellers can be folded. For instance, as shown in FIG. 2, the blades of the propellers of the propulsors 112A, 112D are shown folded in a stowed position. When the blades of the propulsors 112A, 112D are in the stowed position as shown in FIG. 2, the blades of the propulsors 112A, 112D overlap with the wing 106 along the longitudinal direction L1. Folding the blades of some of the propellers can reduce the "disc area" during cruise operation so as to improve overall propulsive efficiency. The blades can also be folded while the aircraft 100 is parked. To transition from horizontal operation back to vertical operation, the propulsors 112B, 112C can continue to rotate to produce thrust and the blades of the propulsors 112A, 112D can be deployed and rotated to produce thrust as well. Then, the wing 106 can be tilted to the vertical tilt position, e.g., as shown in FIG. 1, and the propulsors 112A, 112B, 112C, 112D can produce lift for the aircraft 100.

Further, in this example, the propellers of the propulsors 112A, 112D each include three (3) blades (other numbers of blades are possible), with two (2) blades being positioned above the wing 106 and one (1) blade being positioned below the wing 106 when in the stowed position. Other stowed configurations are possible. For instance, in some aspects, one (1) blade can be positioned above the wing 106 and two (2) blades can be positioned below the wing 106 when in the stowed position.

In accordance with aspects of the present disclosure, the propulsors 112A, 112D can each include features that enable the blades of their respective propellers to safely and actively fold and unfold along their respective flapping axes, e.g., from the deployed position to the stowed position, or vice versa. The propulsors 112B, 112C can also include such features. The blades can be actively controlled to fold or unfold when the blades are at a target azimuthal position that allows the folding blades to clear obstacles, such as nearby aircraft structures (e.g., the wing 106, the fuselage 102, pylons, nacelles, or other nearby aircraft structures). The azimuthal position of the blades can be determined, and the blades can be controlled to fold or unfold, when the azimuthal position of the blades corresponds to the target azimuthal position (or one of a plurality of target azimuthal positions) that allows the blades to fold or unfold without interference, or rather, without striking or contacting a nearby aircraft structure (even despite the blades being able to overlap with a nearby aircraft structure when stowed). Example aspects are presented below to provide further details.

Figure 3:
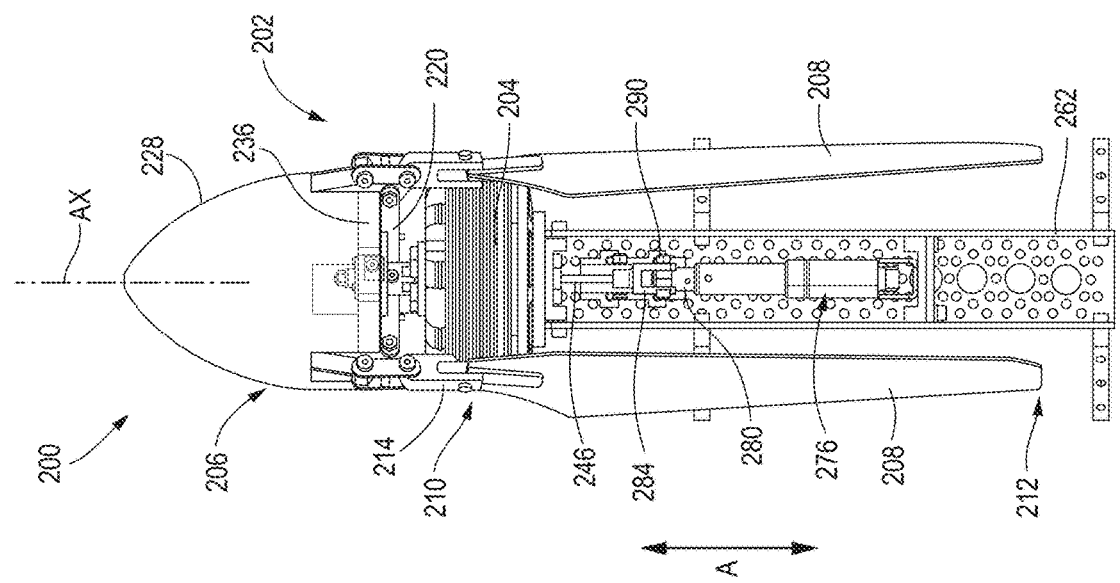
FIGS. 3 and 4 illustrate an electric propulsor in accordance with aspects of the present disclosure, with the electric propulsor having a propeller with blades arranged in a deployed position in FIG. 3 and a stowed position in FIG. 4.
Figure 4:
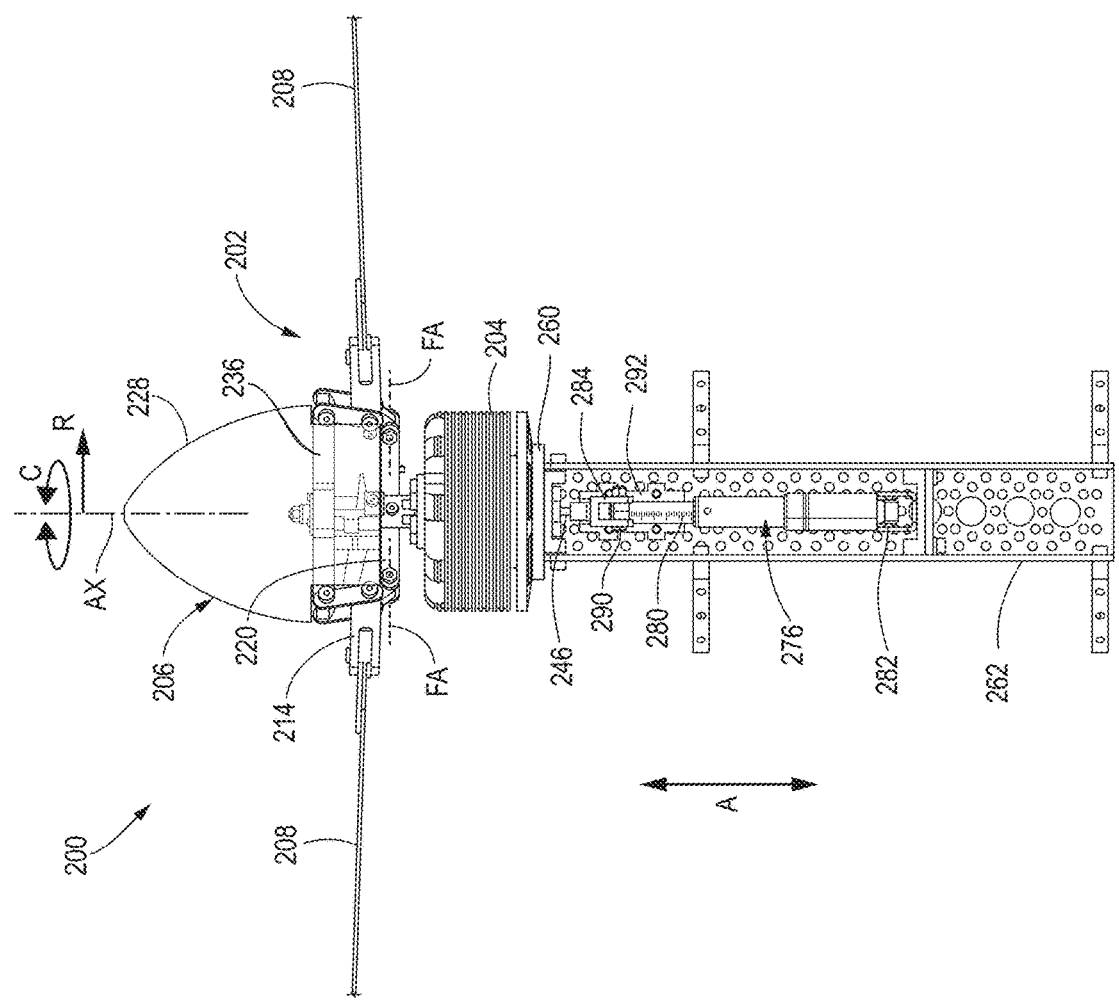

FIGS. 3 and 4 depict an electric propulsor 200 in accordance with example aspects of the present disclosure. The propulsors 112A, 112D (as well as propulsors 112B, 112C) can be configured and controlled in a same or similar manner as the electric propulsor 200. For reference, the electric propulsor 200 defines an axial direction A, and a radial direction R, and a circumferential direction C. The electric propulsor 200 also defines an axis of rotation AX that extends along the axial direction A. Generally, the electric propulsor 200 has a propeller 202, an electric motor 204, and features that enable active folding and unfolding control of blades of the propeller 202.

As shown in FIGS. 3 and 4, the propeller 202 has a hub 206 and blades 208 extending outward from the hub 206 along the radial direction R. The blades 208 are spaced from one another along the circumferential direction C. Each one of the blades 208 has a root 210 and a tip 212. The root 210 of each one of the blades 208 is coupled with a blade root linkage 214 of the hub 206. Each one of the blade root linkages 214 can hold its associated blade 208 using a lead-lag hinge 215, e.g., using a single screw, which allows the blades 208 to move freely in the plane of rotation, minimizing hub loads and vibration transferred to the electric motor 204 and the non-rotating frame. In addition, the blades 208 are movable along respective flapping axes FA between a deployed position and a stowed position. For instance, the blades 208 are shown in the deployed position in FIG. 3 and in the stowed position in FIG. 4. In some aspects, the blades 208 can be pivoted or rotated about their respective flapping axes FA by at least ninety degrees (90°), such as by at least ninety-five degrees (95°). The flapping axes FA can also be considered respective flapping hinges. In some aspects, when propulsive thrust is desired, the blades 208 can be moved to the deployed position and rotated by the electric motor 204 to produce thrust and/or lift, e.g., for an aircraft or other vehicle. When thrust is not desired, the blades 208 can be moved to the stowed position.

Figure 5:
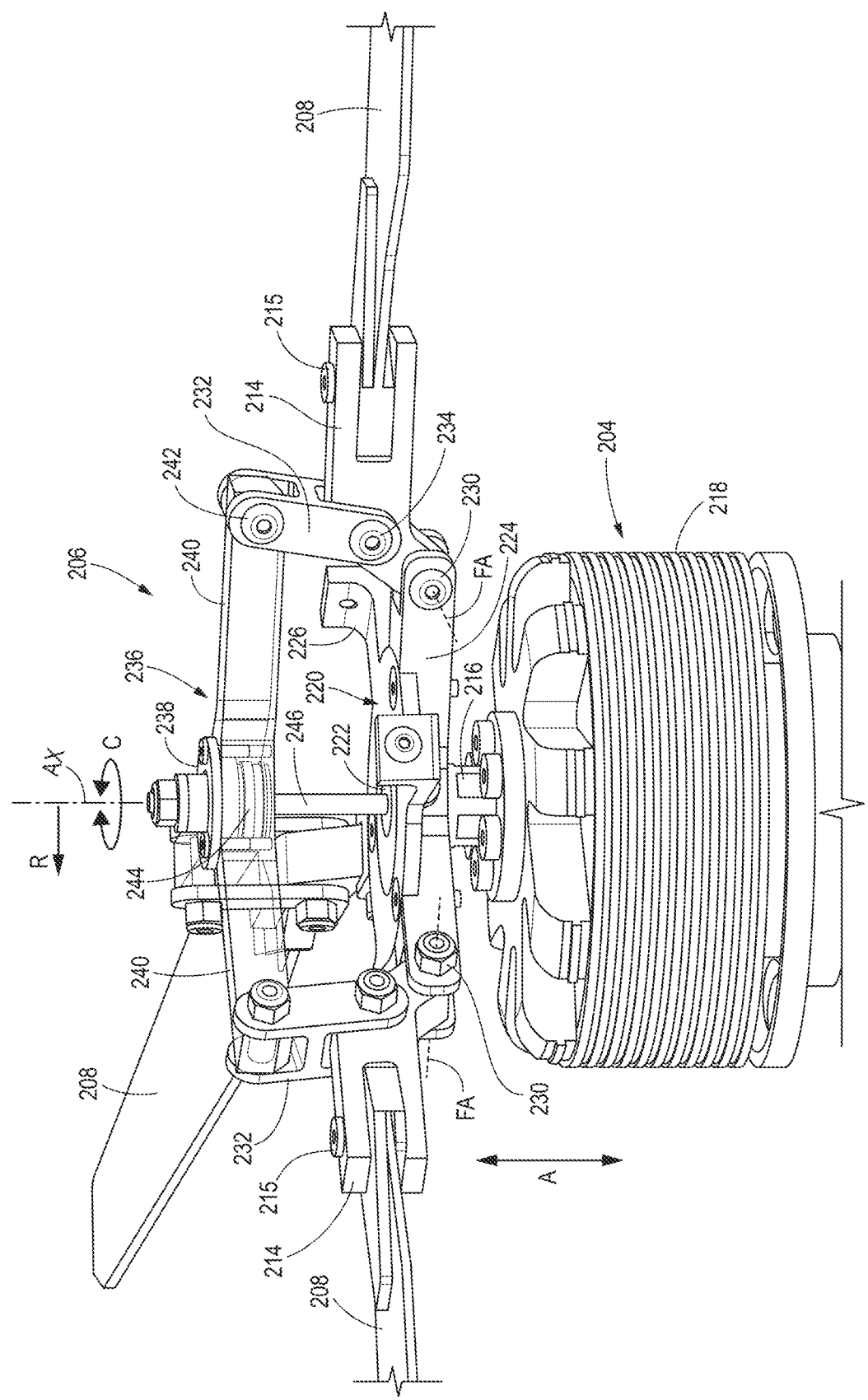
FIG. 5 depicts a close-up view of a hub of the propulsor of FIGS. 3 and 4.

FIG. 5 illustrates a close-up perspective view of the hub 206. As shown in FIG. 5, the hub 206 has a hub pedestal 216 that is coupled with the electric motor 204. In at least some aspects, the hub pedestal 216 is attached to a rotor 218 of the electric motor 204 using an array of mechanical fasteners, such as screws. A static spider 220 is attached to the hub pedestal 216. The static spider 220, while rotatable about the axis of rotation AX along with the other components of the propeller 202, is static or non-translatable along the axial direction A. The static spider 220 has a center core 222 that connects to the hub pedestal 216 and a plurality of arms 224 that extend outward from the center core 222 along the radial direction R. A plurality of carrier arms 226 extend outward from the center core 222 along the radial direction R as well. The carrier arms 226 are each positioned between adjacent pairs of the arms 224 along the circumferential direction C. The carrier arms 226 connect to and support a spinner 228 (see FIGS. 3 and 4 showing the spinner 228, which is transparent in FIGS. 3 and 4 for illustrative purposes) that is aerodynamically contoured to facilitate air flow through the plurality of blades 208.

At a tip or distal end of each one of the arms 224, hinges 230 hold respective ones of the blade root linkages 214. That is, the hinges 230 are arranged at the tips of the arms 224, and the hinges 230 pivotably couple the blade root linkages 214 with the static spider 220. The flapping axes FA are defined along the hinge axes of the hinges 230. The blade root linkages 214 hold their respective blades 208 using a mechanical fastener (e.g., a single screw) that works as lead-lag hinge. The hub 206 also includes a plurality of connector linkages 232, with each connector linkage 232 being attached on one end to a second hinge 234 of one of the blade root linkages 214 and at the other end with a sliding spider 236.

The sliding spider 236 has a center core 238 and a plurality of arms 240 extending outward from the center core 238 along the radial direction R. In FIG. 5, portions of the center core 238 and the arms 240 are transparent for illustrative purposes. At a tip or distal end of each one of the arms 240, hinges 242 hold respective ones of the connector linkages 232. That is, the hinges 242 are arranged at the tips of the arms 240, and the hinges 424 pivotably couple respective ones of the connector linkages 232 with respective arms 240 of the sliding spider 236. The center core 238 of the sliding spider 236 holds a de-spinner 244 that connects to a control rod 246. The de-spinner 244, or de-spinner bearing, allows the sliding spider 236 (and other components of the propeller 202) to rotate without causing the control rod 246 to rotate. In this way, the control rod 246 is a non-rotating control rod. Stated another way, the de-spinner 244 allows the sliding spider 236 to spin with the rest of the hub 206 while keeping the control rod 246 on the static frame. The sliding spider 236 is translatable relative to the static spider 220 (e.g., along the axial direction A) by translation of the control rod 246. In this way, translation of the control rod 246 can cause the blades 208 to fold or unfold along their respective flapping axes FA.

Figure 6:
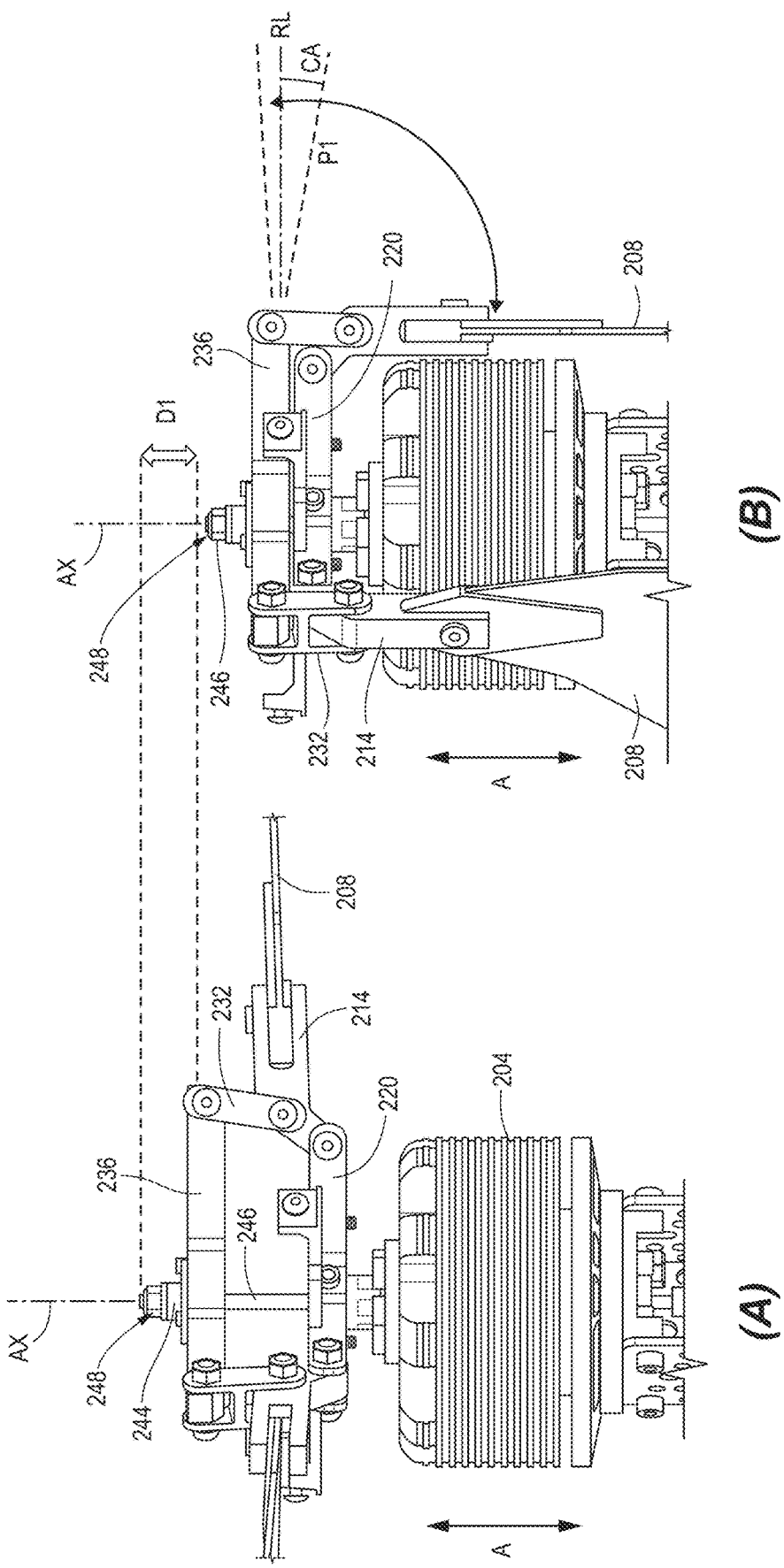
FIG. 6 depicts a close-up view of the hub of the propulsor of FIGS. 3 and 4, with drawing (A) showing the blades moved to the deployed position and drawing (B) showing the blades moved to the stowed position.

For instance, in drawing (A) of FIG. 6 (and in FIGS. 3 and 5), the sliding spider 236 is shown spaced from the static spider 220 along the axial direction A when the blades 208 are deployed. In contrast, in drawing (B) of FIG. 6 (and in FIG. 4), the sliding spider 236 is shown much closer to the static spider 220 along the axial direction A (e.g., touching or nearly touching) when the blades 208 are folded in the stowed position. Accordingly, translation of the control rod 246 (e.g., along the axial direction A) can cause the sliding spider 236 to translate relative to the static spider 220, which effectively moves the blades along their respective flapping axes FA. In controlling the blades 208 between the deployed and stowed positions, the control rod 246 can be displaced a distance D1 along the axial direction A. In some aspects, ~17 mm of displacement can achieve ~95 degrees of blade flapping motion.

In particular, in moving the blades 208 from the deployed position to the stowed position, the control rod 246 can be translated so that a first end 248 of the control rod 246 is moved toward the static spider 220 along the axial direction A. The linear actuation of the control rod 246 is transformed into an angular displacement of each of the blade root linkages 214. Specifically, the translation of the control rod 246 toward the static spider 220 along the axial direction A causes the sliding spider 236 to move toward the static spider 220 as well, which causes the connector linkages 232 to apply forces to their respective blade root linkages 214. Consequently, the blade root linkages 214 are caused to pivot about their respective hinges 230 (or flapping axes FA) so that the blades 208 are moved into the stowed position, e.g., as shown in drawing (B) of FIG. 6. The static spider 220 acts as the "grounding linkage" and provides the pivot point for the blades 208 as it remains static (i.e., non-translating) as the sliding spider 236, connector linkages 232, and the blade root linkages 214 move during the folding process.

In moving the blades 208 from the stowed position to the deployed position, the control rod 246 can be translated so that the first end 248 of the control rod 246 is moved away from the static spider 220 along the axial direction A. The linear actuation of the control rod 246 is transformed into an angular displacement of each of the blade root linkages 214. Specifically, the translation of the control rod 246 away from the static spider 220 along the axial direction A causes the sliding spider 236 to move away from the static spider 220 as well, which causes the sliding spider 236 to "pull" the connector linkages 232 along therewith. As a result, the blade root linkages 214 are caused to pivot about their respective hinges 230 (or flapping axes FA) so that the blades 208 are moved into the deployed position, e.g., as shown in drawing (A) of FIG. 6. The static spider 220 acts as the "grounding linkage" and provides the pivot point for the blades 208 as it remains static (i.e., non-translating) as the sliding spider 236, connector linkages 232, and the blade root linkages 214 move during the unfolding process.

Figure 7:
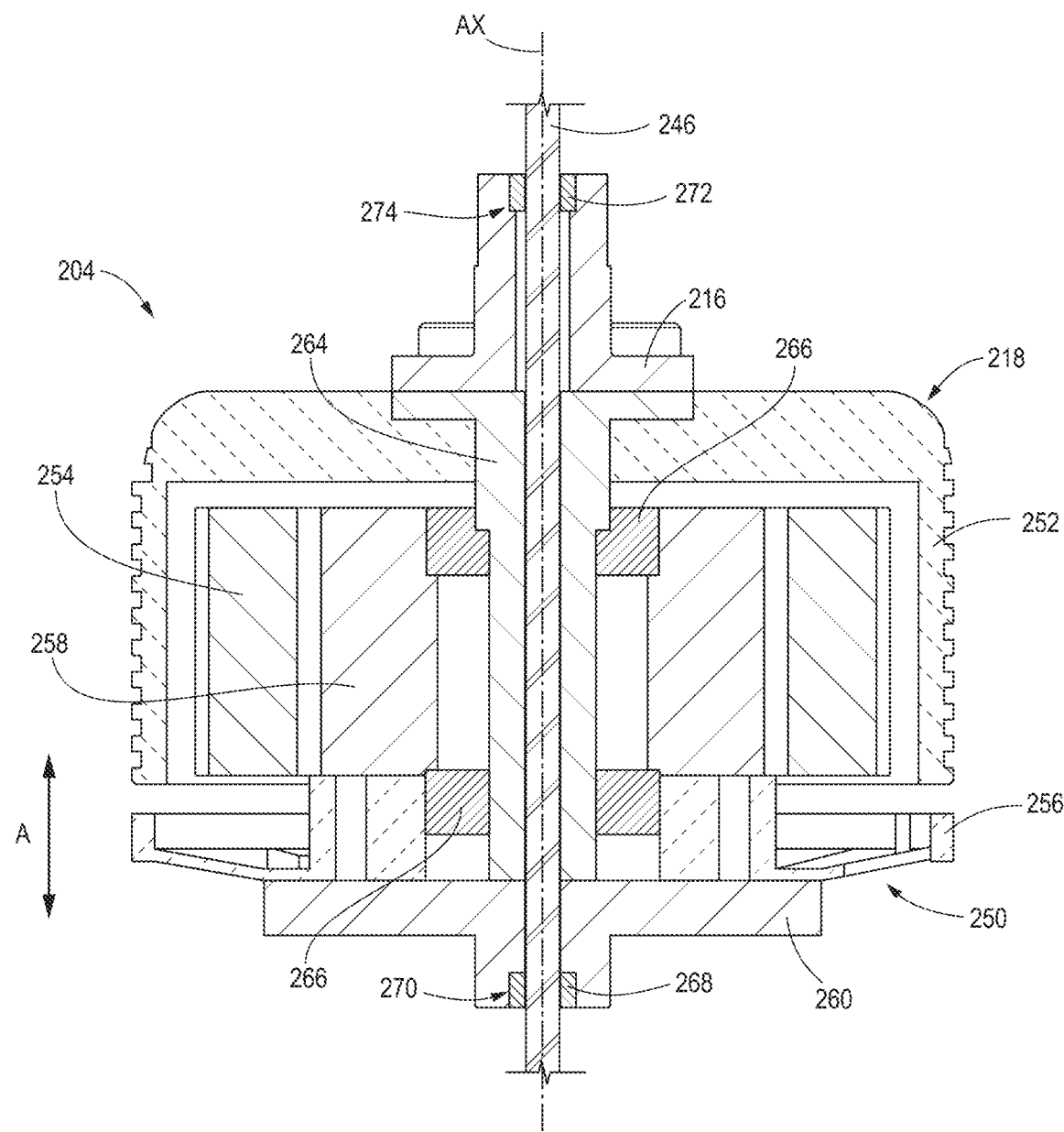
FIG. 7 depicts a cross-sectional view of an electric motor of the propulsor of FIGS. 3 and 4 and shows the control rod extending through the electric motor.

With reference to FIGS. 3 and 4, and also to FIG. 7, the electric motor 204 of the electric propulsor 200 can be coupled with the hub 206 and is arranged to rotatably drive the propeller 202 about the axis of rotation AX, e.g., to produce thrust and/or lift for an aircraft. The electric motor 204 can be a brushless outrunner DC motor, for example. In alternative aspects, the electric motor 204 can have other configurations. As depicted in FIG. 7, the electric motor 204 includes a rotating rotor 218 that rotates relative to a stator 250. The rotor 218 can rotate about the axis of rotation AX and can thus drive the propeller 202 to rotate, e.g., in unison with the rotor 218. The rotor 218 can include a bell housing 252 to which a plurality of permanent magnets 254 are coupled. The stator 250, which is non-rotating, can include a stator housing 256 enclosing windings 258. As will be appreciated by those of ordinary skill in the art without undue experimentation, when an electric current is supplied to the windings 258, the windings 258 can magnetically couple with the permanent magnets 254, causing the rotor 218 to rotate about the axis of rotation AX, which effectively rotatably drives the propeller 202 about the axis of rotation AX. The stator 250 is supported by a motor mount 260, which mounts to a mounting frame 262 (FIGS. 3 and 4).

As further shown in FIG. 7, the rotor 218 can include a hollow shaft 264 extending centrally through the rotor 218 along the axial direction A. Bearings 266 can support the hollow shaft 264. The hollow shaft 264 can include a flange that is coupled (e.g., using an array of mechanical fasteners, such as screws) with a complementary flange of the hub pedestal 216. The hollow shaft 264 can define an interior volume. The hub pedestal 216 can also define an interior volume aligned with the interior volume of the hollow shaft 264. Likewise, the motor mount 260 can define an interior volume aligned with the interior volume of the hollow shaft 264. Accordingly, as illustrated in FIG. 7, the control rod 246 can be received by the interior volumes of the hub pedestal 216, the hollow shaft 264, and the motor mount 260. In this regard, the control rod 246 can extend through the electric motor 204. The control rod 246 can be supported by a first bushing 268 arranged in a recessed pocket 270 of the motor mount 260 and by a second bushing 272 arranged in a recessed pocket 274 of the hub pedestal 216.

Figure 8:
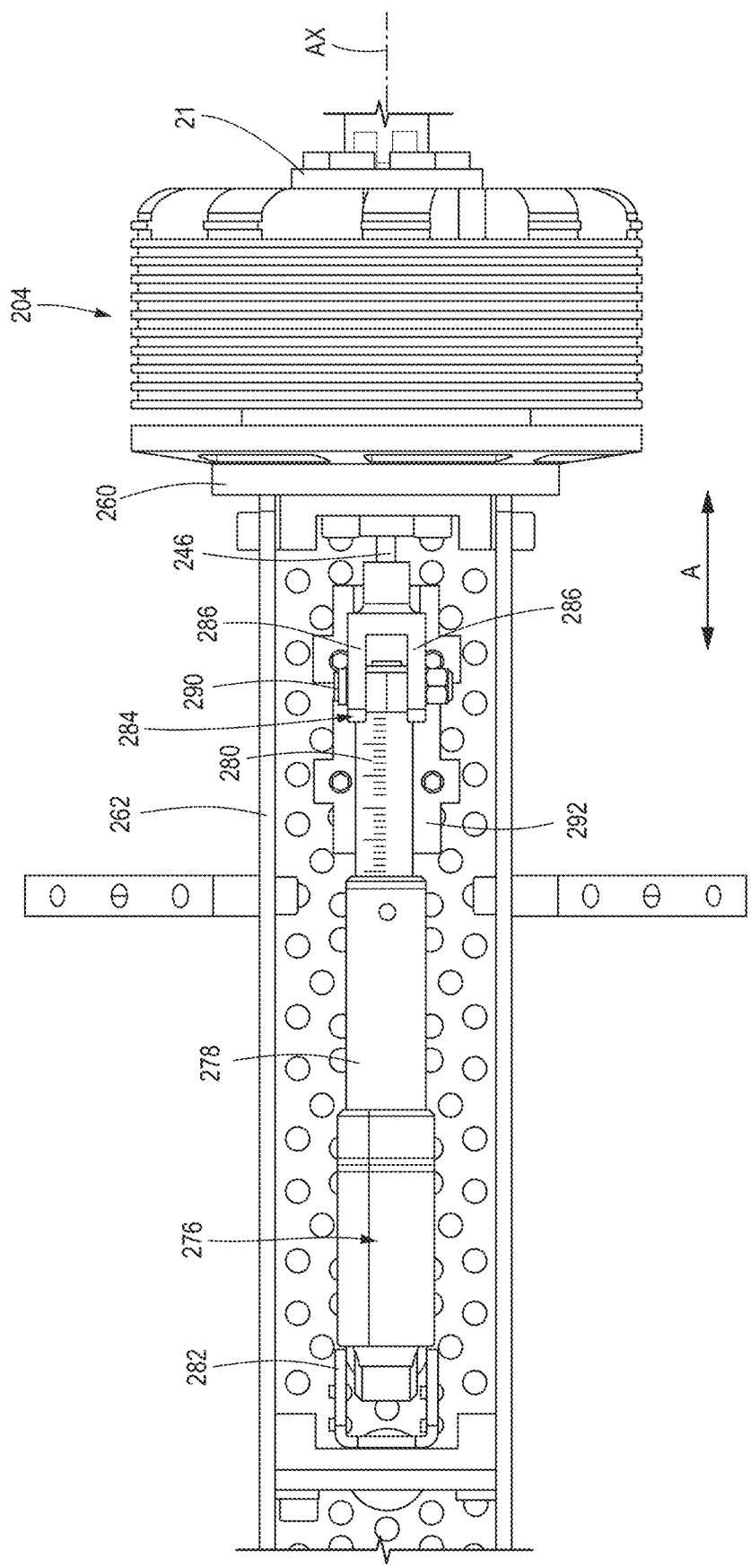
FIG. 8 depicts a mounting frame and actuator of the propulsor of FIGS. 3 and 4.

With reference now to FIGS. 3 and 4, and also to FIG. 8, the mounting frame 262 can couple the electric propulsor 200 with a vehicle structure, such as a wing, a fuselage, etc. As noted above, the motor mount 260 can couple the electric motor 204 (and consequently the propeller 202) with the mounting frame 262. The mounting frame 262 can provide a mounting platform for various components. For instance, an actuator 276 can be mounted to the mounting frame 262. The actuator 276 can be a linear electric actuator, for example. The actuator 276 can include an actuator housing 278 and a control arm 280 that can be controlled to move relative to the actuator housing 278, or more particularly, the control arm 280 can be controlled to translate with respect to the actuator housing 278 along the axial direction A. The control arm 280 is generally aligned with the axis of rotation AX. In this regard, the control arm 280 can translate along the axial direction A and in line with the axis of rotation AX.

The actuator housing 278 is coupled with the mounting frame 262 by way of a hinge 282.

Figure 9:
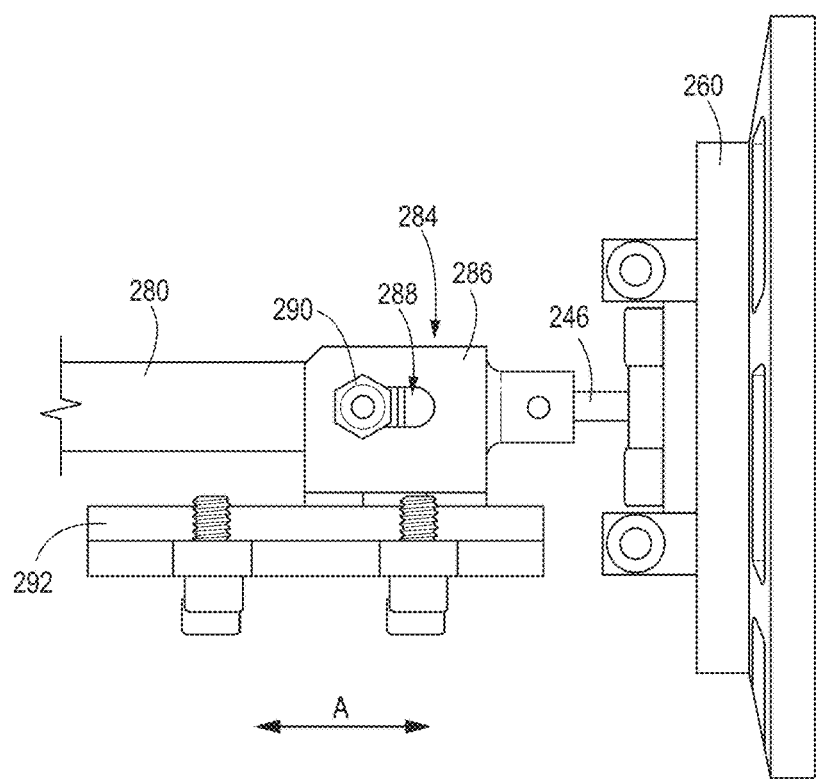
FIG. 9 depicts a close-up view of a pin and slotted clevis coupling of the actuator and a control rod of the propulsor of FIGS. 3 and 4.

The control arm 280 is coupled with the control rod 246. The control rod 246 has, or is coupled with, a clevis 284 having opposing arms 286 that define complementary slots 288 (see FIG. 9, showing the slot 288 defined by one of the arms 286). The slots 288 can be elongated slots, each having a length extending along the axial direction A (or actuation direction), a width, and a depth (i.e., the thickness of one of the arms 286), with the length being greater than the width. The control arm 280 of the actuator 276 is received between the opposing arms 286. Moreover, the control arm 280 has a pin 290 coupled with its end. The pin 290 is slidably received within the complementary slots 288. Accordingly, the pin 290 can be slid through one of the slots 288, through the end of the control arm 280, and through the other one of the slots 288. The pin 290 can then be secured, e.g., by a nut or other securing mechanism. Thus, the control arm 280 of the actuator 276 is coupled with the control rod 246 using a slotted clevis and pin mechanism. The complementary slots 288 can help deter over constraining the blade-folding control mechanisms of the hub 206 and the control rod 246, as will be explained more fully below.

When the control arm 280 extends or retracts with respect to the actuator housing 278 along the axial direction A, the control rod 246 is correspondingly translated along the axial direction A. As illustrated in FIGS. 8 and 9, a clevis guide rail 292 is mounted to the mounting frame 262 and is arranged to guide the translating clevis 284 as it moves along the axial direction A. In this way, the clevis guide rail 292 supports the clevis 284 during translation. The clevis guide rail 292 also advantageously dampens torque that may be applied to the control rod 246 by the propeller 202, which helps to avoid rotational motion of the control rod 246.

Figure 12:
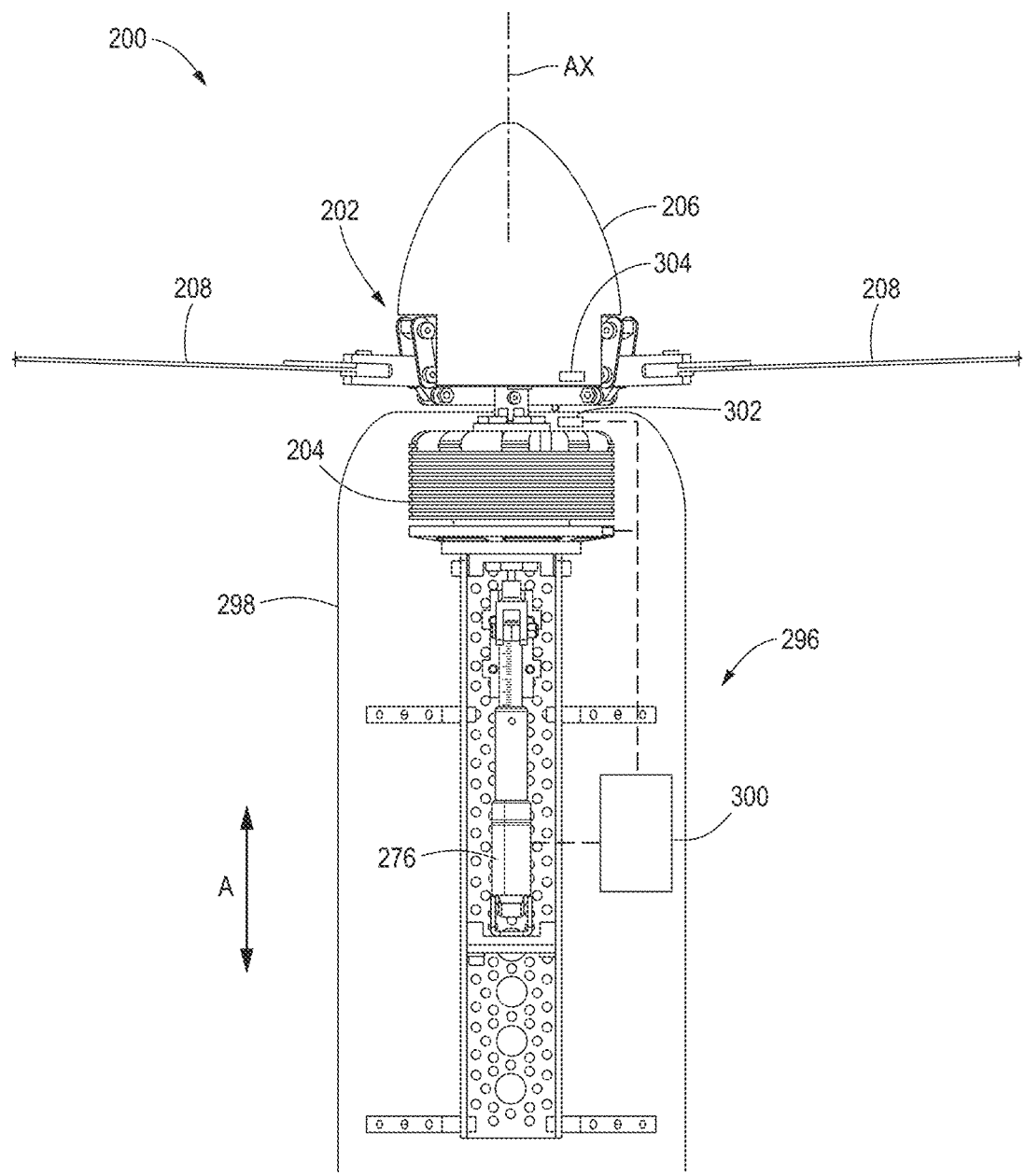
FIG. 12 is a schematic view of the electric propulsor of FIGS. 3 and 4.

With reference now to FIG. 12, the electric propulsor 200 further includes a blade control system 296. The blade control system 296 includes features to actively control the folding or unfolding of the blades 208 and to ensure that the blades 208 are aligned with a target azimuthal position before folding or unfolding the blades 208, e.g., so as to avoid interference of the blades 208 with nearby aircraft structures. The blade control system 296 includes computing elements, one or more sensors, and one or more controllable devices to control the mechanical blade folding elements. The electric motor 204, the actuator 276, and the mounting frame 262 can be arranged within an interior volume of a nacelle 298 as illustrated in FIG. 12.

For the depicted example of FIG. 12, the blade control system 296 includes a computing system 300 having one or more processors and one or more memory devices (e.g., one or more non-transitory memory devices). The computing system 300 can be communicatively coupled with one or more controllable devices and one or more sensors, e.g., by way of one or more wired and/or wireless communication links. For instance, the computing system 300 can be communicatively coupled with the actuator 276 and can command the actuator 276 to translate the control arm 280 to cause translation of the control rod 246 and ultimately the folding or unfolding of the blades 208. The computing system 300 is also communicatively coupled with the electric motor 204, such as to a motor drive thereof, enabling speed control of the rotor 218 of the electric motor 204. The motor drive can include one or more switches that can be modulated to control the flow of electric current to the windings 258 of the stator 250 and thus the speed of the rotor 218 of the electric motor 204. In some aspects, the electric motor 204 can include a position sensor (e.g., a motor encoder) that can sense a position of the rotor of the electric motor 204. The computing system 300 can also be communicatively coupled with a position sensor 302. In at least some example aspects, the position sensor 302 can be a Hall-effect sensor operable to detect a magnet 304 of the hub 206. Based on detection of the magnet 304, the position sensor 302 can provide inputs to the computing system 300 indicating an azimuthal position of the blades 208 with respect to some reference.

The arrangement of the position sensor 302 in FIG. 12 is but one example implementation for sensing the azimuthal position of the blades 208. In other aspects, other configurations or types of sensors can be utilized to determine the azimuthal position of the blades 208. For instance, when the rotor 218 of the electric motor 204 rotates in unison with the propeller 202, and the arrangement of the blades 208 is known, the position of the rotor 218 can be indicative of the azimuthal position of the blades 208. In such aspects, the motor encoder can be used to determine the azimuthal position of the blades 208. In some further aspects, instead of a Hall-effect sensor, an optical encoder can be used to determine the azimuthal position of the blades 208.

With the architecture of the electric propulsor 200 generally described, an example manner in which the blades 208 can be actively folded or unfolded, without the blades 208 interfering with any nearby structures, will now be provided below.

Figure 13:
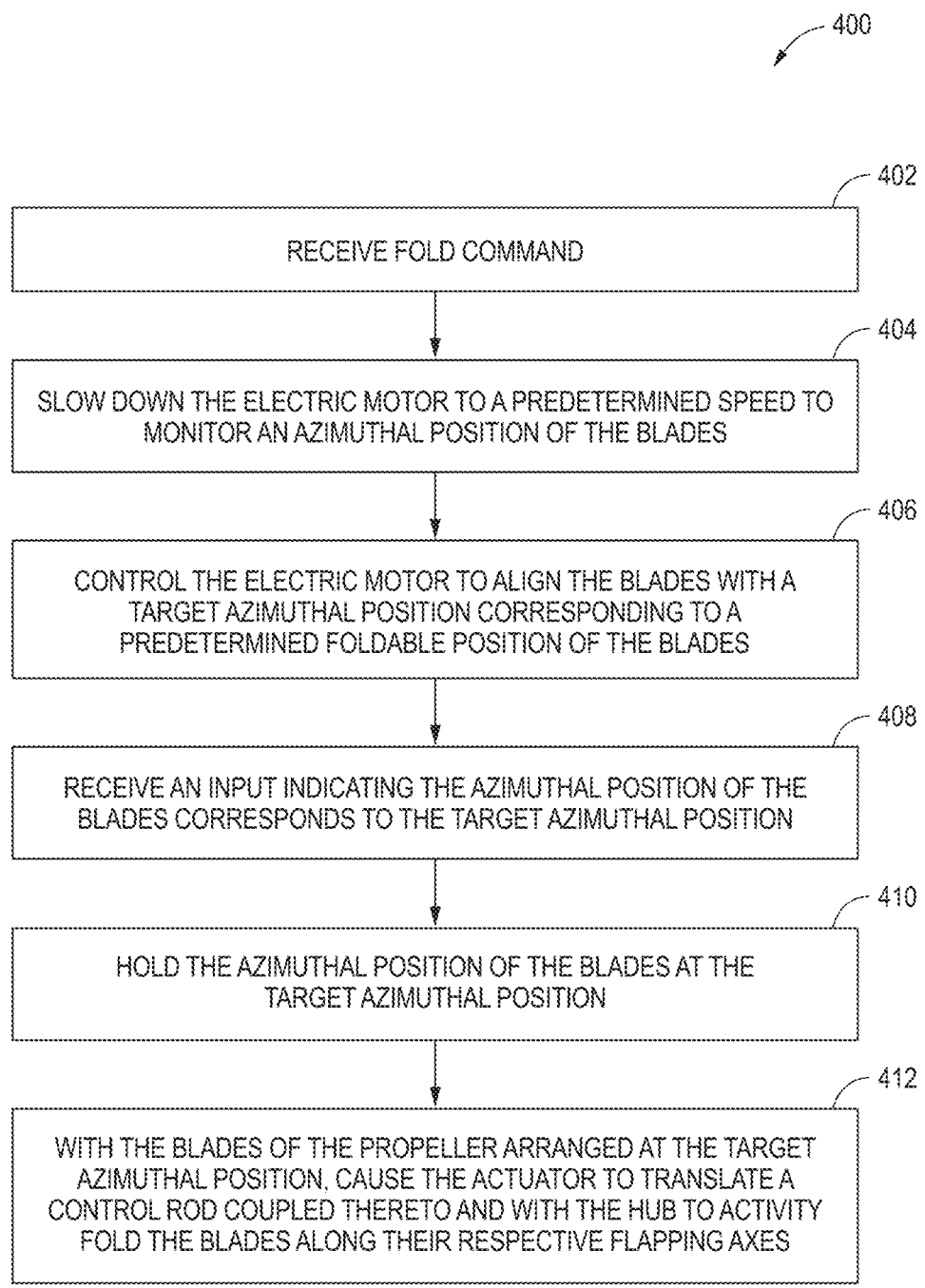
FIG. 13 is a flow diagram for a method of folding blades of a foldable propeller according to example aspects of the present disclosure.

With reference to FIG. 13, and also generally to FIGS. 3 through 12 to provide context, a method 400 of actively folding blades of a propeller will be provided. In this way, the method 400 can include moving blades of a propeller from the deployed position to the stowed position. The electric propulsor 200 and its elements will be referenced to provide context to the method 400.

At 402, the method 400 can include receiving a fold command. For instance, the computing system 300 can receive a fold command from a flight management system of an aircraft to which the computing system 300 is communicatively coupled. A fold command can be received in a number of situations. As one example, a fold command can be received when the blades 208 are in the deployed position and rotating, e.g., when the aircraft has been moved into a parked position and it is desirable to fold the blades 208 to increase safety around the aircraft for ground crew members. As another example, a fold command can be received when the blades 208 are in the deployed position and rotating during cruise flight, e.g., if it is noticed that one of the blades 208 of the electric propulsor 200 has been damaged. As another example, a fold command can be received after a tilt-wing VTOL aircraft has transitioned from vertical operation to horizontal operation and it is desired to reduce the disc area for cruise flight, which can improve the overall propulsive efficiency of the aircraft.

At 404, the method 400 can include slowing down the electric motor to a predetermined speed to monitor an azimuthal position of the blades. That is, the rotational speed of the electric motor can be decreased to a "seek position" rotational speed to facilitate determining the azimuthal position of the blades. For instance, with the blades 208 deployed and rotating, the computing system 300 can control the electric motor 204 to slow down, e.g., by commanding a motor drive thereof to reduce electric current provided to the windings 258 of the stator 250 and/or by applying a motor brake. When the electric motor 204 is slowed to a predetermined "seek position" speed, the azimuthal position of the blades 208 can be clocked. Slowing down or reducing the speed of the electric motor 204 correspondingly reduces the rotational speed of the propeller 202.

At 406, the method 400 can include controlling the electric motor to align the blades with a target azimuthal position. The target azimuthal position can correspond to a predetermined foldable position of the blades. In some aspects, the target azimuthal position can be one of a plurality of possible target azimuthal positions. For instance, if the propeller has three blades (3), at least three possible target azimuthal positions are contemplated, or rather, at least three (3) possible predetermined foldable positions in which the blades can be folded without contacting a nearby structure are contemplated.

In some aspects at 406, utilizing the azimuthal position of the blades 208 received at 404, the electric motor 204 can be controlled so that the blades 208 are aligned with a target azimuthal position, which can be an azimuthal position that allows the blades 208 to fold without interference, or rather, without striking a nearby aircraft structure. In some aspects, the electric motor 204 can come to a complete stop and then rotated so that the blades 208 are aligned with the target azimuthal position. In other aspects, with the electric motor 204 decreased in rotational speed at 404 and the azimuthal position of the blades 208 (or rotor 218) being clocked, the electric motor 204 can be controlled to stop at an azimuthal position that aligns the blades 208 with the target azimuthal position. A control loop utilizing feedback from the position sensor 302 can be implemented to control the electric motor 204 so that the blades 208 align with the target azimuthal position. With the blades 208 aligned with the target azimuthal position, the blades 208 can be folded without striking nearby structures.

At 408, the method 400 can include receiving an input indicating an azimuthal position of the blades corresponds to the target azimuthal position. Stated differently, an input can be received indicating that the azimuthal position of the blades are at a correct azimuthal position, or rather, at the target azimuthal position. For instance, the computing system 300 can receive an input from the position sensor 302 that indicates the azimuthal position of the blades 208. In some aspects, the inputs can be received from the position sensor 302 depicted in FIG. 12 (e.g., a Hall-effect sensor). In other aspects, the inputs indicating the azimuthal position of the blades 208 can be received from a motor encoder of the electric motor 204. In yet other aspects, inputs indicating the azimuthal position of the blades 208 can be provided from some other sensor.

At 410, the method 400 can include holding the azimuthal position of the blades at the target azimuthal position. For instance, when the azimuthal position of the blades 208 corresponds to the target azimuthal position of the blades 208, the electric motor 204 can be stopped and controlled to hold its position, which holds the azimuthal position of the blades 208 at the target azimuthal position. As one example, the computing system 300 can control the electric motor 204 to stop, e.g., by commanding a motor drive thereof to cease providing electric current to the windings 258 of the stator 250, and applying a motor brake to hold the rotor 218 in position relative to the stator 250. This holds the blades 208 in position for the folding operation.

Figure 10:
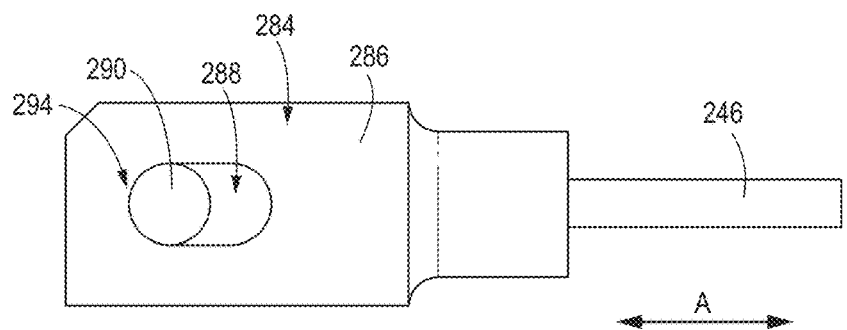
FIG. 10 depicts a close-up view of the pin arranged in the slot of the clevis when the blades are moved to the stowed position.

At 412, with the blades of the propeller arranged at the target azimuthal position, the method 400 can include causing the actuator to translate a control rod coupled thereto and with the hub to actively fold the blades along their respective flapping axes. For instance, to move the blades 208 from the deployed position to the stowed position, the computing system 300 can command the control arm 280 of the actuator 276 to retract so that the pin 290 engages respective ends 294 of the slots 288 as shown in FIG. 10 (only one of the slots 288 is shown in FIG. 10). With the pin 290 engaged with the ends 294 of the slots 288, the control rod 246 is pulled toward the actuator housing 278 in which the control arm 280 retracts, or rather, so that the clevis 284 is moved away from the electric motor 204 and the propeller 202 along the axial direction A. This causes the blades 208 to actively fold along their respective flapping axes FA to the stowed position. Specifically, when the control rod 246 is actuated so that the clevis 284 is pulled toward the actuator 276 along the axial direction A, the sliding spider 236 is correspondingly translated toward the static spider 220 along the axial direction A, which causes the blades 208 to fold along their respective flapping axes FA.

The folding process of the blades 208 can be further appreciated by comparing the features of the electric propulsor 200 in FIGS. 3 and 4. In FIG. 3, the blades 208 are in the deployed position, the sliding spider 236 is spaced from static spider 220 along the axial direction A, and the control rod 246 and the control arm 280 are extended. In FIG. 4, in comparison, the blades 208 are in the stowed position, the sliding spider 236 is moved much closer to the static spider 220 along the axial direction A than in FIG. 3 (the control rod 246 can be displaced by the distance D1 along the axial direction A as shown in FIG. 6, causing the sliding spider 26 coupled with the control rod 246 to slide toward the static spider 220), and the control rod 246 and the control arm 280 are retracted. The engagement of the pin 290 with the ends 294 of the slots 288 (FIG. 10) locks the blades 208 in the stowed position. In some aspects, the pin 290 can lock the blades 208 in the stowed position mechanically without need for electric power to be supplied to the actuator 276.

In aspects in which the blades 208 are adjustable pitch blades, the blades 208 can be pitched to a low or fine pitch position (e.g., to a ground fine pitch position, a flight fine position, within ten degrees of (10°) of zero degrees (0°), etc.). This can decrease the folded profile of the blades 208 when in the stowed position.

Figure 14:
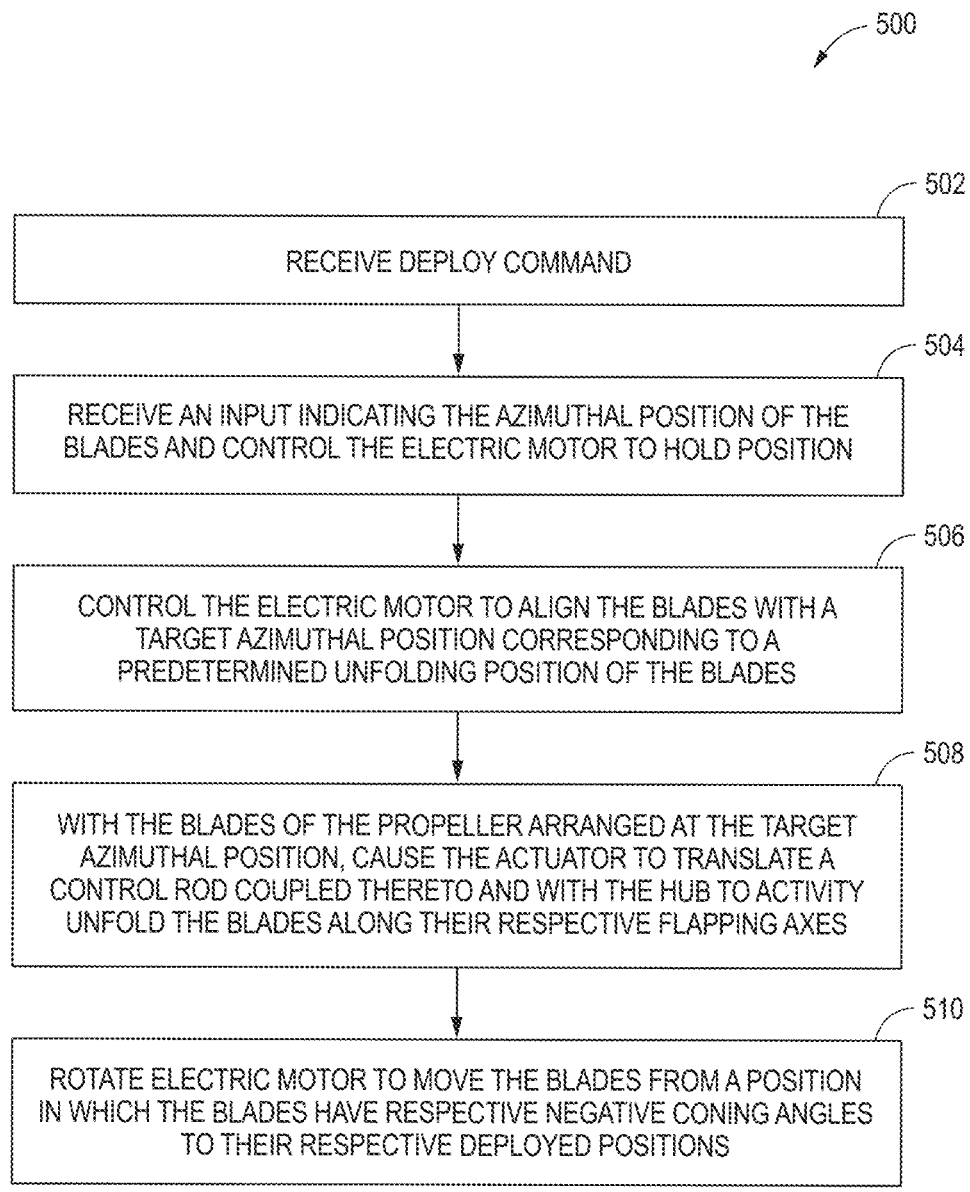
FIG. 14 is a flow diagram for a method of deploying blades of a foldable propeller according to example aspects of the present disclosure.

With reference to FIG. 14, and also generally to FIGS. 3 through 12 to provide context, a method 500 of actively unfolding or deploying blades of a propeller will be provided. In this regard, the method 500 can include moving blades of a propeller from the stowed position to the deployed position. The electric propulsor 200 and its elements will be referenced to provide context to the method 500.

At 502, the method 500 can include receiving a deploy command. For instance, the computing system 300 can receive a deploy command from a flight management system of an aircraft to which the computing system 300 is communicatively coupled. A deploy command can be received in situations when it is desired for the electric propulsor 200 to produce thrust and/or lift.

At 504, the method 500 can include receiving an input indicating an azimuthal position of the blades and the electric motor can be controlled to hold position. For instance, upon receiving the deploy command, the position sensor 302 can be activated to sense the azimuthal position of the blades 208 of the propeller 202. The computing system 300 can receive an input from the position sensor 302 that indicates the azimuthal position of the blades 208. In some aspects, the input can be received from the position sensor 302 depicted in FIG. 12 (e.g., a Hall-effect sensor). In other aspects, the input indicating the azimuthal position of the blades 208 can be received from a motor encoder of the electric motor 204. In yet other aspects, the input indicating the azimuthal position of the blades 208 can be provided from some other sensor.

In some aspects, when the electric motor 204 is stopped, the rotor 218 of the electric motor 204 can be controlled to rotate one or more revolutions (e.g., in a relatively slow and controlled manner) so that the position sensor 302 can detect the azimuthal position of the blades 208. In other aspects, when the azimuthal position of the blades 208 has been locked or maintained since a last deployment, the input indicating the azimuthal position of the blades can be a last known azimuthal position of the blades 208.

At 506, the method 500 can include controlling the electric motor to align the blades with a target azimuthal position. The target azimuthal position can correspond to a predetermined unfolding position of the blades. For instance, utilizing the azimuthal position of the blades 208 received at 504, the electric motor 204 can be controlled so that the blades 208 are aligned with a target azimuthal position, which can be an azimuthal position that allows the blades 208 to unfold without interference, or rather, without striking a nearby aircraft structure. In some aspects, from a stopped position and utilizing the azimuthal position of the blades 208 received at 504, the electric motor 204 can be rotated so that the blades 208 become aligned with the target azimuthal position. In other aspects, as the electric motor 204 is rotated in a relatively slow and controlled manner and the azimuthal position of the blades 208 (or rotor 218) is being clocked at 504, the electric motor 204 can be controlled to stop at an azimuthal position that aligns the blades 208 with the target azimuthal position. In this way, the electric motor 204 need not be stopped after obtaining the current azimuthal position of the blades 208. In yet other aspects, the blades 208 can be determined to already be positioned at the target azimuthal position. In such instances, controlling the electric motor 204 to align the blades 208 with the target azimuthal position can include maintaining the electric motor in its current azimuthal position. With the blades 208 aligned with the target azimuthal position, the blades 208 can be unfolded or deployed without striking nearby structures.

At 508, with the blades of the propeller arranged at the target azimuthal position, the method 500 can include causing the actuator to translate a control rod coupled thereto and with the hub to actively unfold the blades along their respective flapping axes. This can be accomplished with the electric motor stopped (i.e., not rotating). For instance, to move the blades 208 from the stowed position to the deployed position, the computing system 300 can command the control arm 280 of the actuator 276 to extend so as to translate the control rod 246 away from the actuator housing 278 along the axial direction A, or rather, so that the clevis 284 is moved toward the electric motor 204 and the propeller 202 along the axial direction A. The extension of the control arm 280 and resultant translation of the control rod 246 causes the blades 208 to actively unfold along their respective flapping axes FA toward the deployed position. Specifically, when the control rod 246 is actuated so that the clevis 284 is moved toward the electric motor 204 along the axial direction A, the sliding spider 236 is correspondingly translated away from the static spider 220 along the axial direction A, which causes the blades 208 to unfold along their respective flapping axes FA.

The deployment or unfolding process of the blades 208 can be further appreciated by comparing the features of the electric propulsor 200 in FIGS. 3 and 4. In FIG. 4, the blades 208 are in the stowed position, the sliding spider 236 is relatively close to the static spider 220 along the axial direction A, and the control rod 246 and the control arm 280 are retracted. In comparison, in FIG. 3, the blades 208 are in the deployed position, the sliding spider 236 is spaced from static spider 220 along the axial direction A (the control rod 246 can be displaced by the distance D1 along the axial direction A as shown in FIG. 6, causing the sliding spider 26 coupled with the control rod 246 to slide away from the static spider 220), and the control rod 246 and the control arm 280 are extended.

Figure 11:
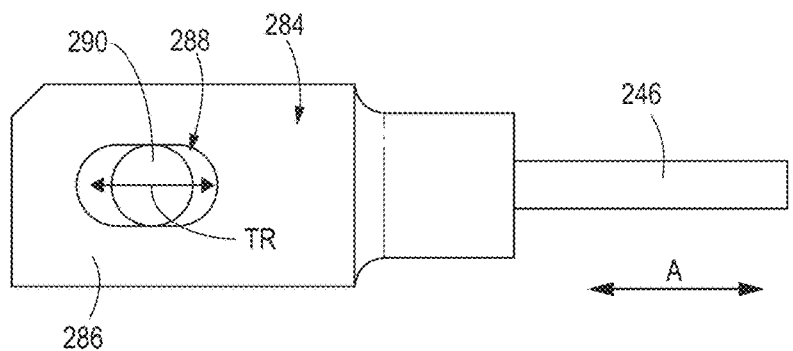
FIG. 11 depicts a close-up view of the pin arranged in the slot of the clevis when the blades are moved to the deployed position.

At 510, the method 500 can include rotating the electric motor to move the blades from a position in which the blades have respective negative coning angles to the deployed position, or rather, an equilibrium position. For instance, in some aspects, when unfolding or deploying the blades 208 of the propeller 202, the actuator 276 can open the blades 208 to a flapping angle or position P1 that results in a negative coning angle CA (i.e., with the blades drooping relative to a reference line RL, as represented in drawing (B) of FIG. 6). As the electric motor 204 starts spinning, the centrifugal and aerodynamic forces can increase the coning angle CA to an equilibrium position. Notably, the function of the slots 288 in the clevis 284 is to avoid loading the actuator 276 when the propeller 202 is spinning. In this regard, the slots 288 effectively provide a "dead zone" where the control rod 246 is allowed to move without loading the actuator 276. As shown in FIG. 11, the clevis 284 is allowed to translate relative to the pin 290 along the axial direction A during rotation of the blades 208, as represented by arrow TR. That is, clevis 284 is translatable relative to the pin 290 so that the actuator 276 is not loaded during rotation of the blades 208. Thus, the control rod 246 is not anchored by the actuator 276 during deployment and rotation of the blades 208. This feature also eliminates or reduces the need to have a precise actuation setpoint position when the propeller 202 is deployed. Further, due to the coupling arrangement of the actuator 276 and the slotted clevis 284 of the control rod 246, electric power need not be supplied to the actuator 276 when the blades 208 are in the deployed position.

In aspects in which the blades 208 are adjustable pitch blades, the blades 208 can be pitched to a low or fine pitch position (e.g., to a ground fine pitch position, a flight fine position, within ten degrees of (10°) of zero degrees (0°), etc.). This can allow the blades to reach equilibrium faster from their respective negative coning angles.

Figure 15:
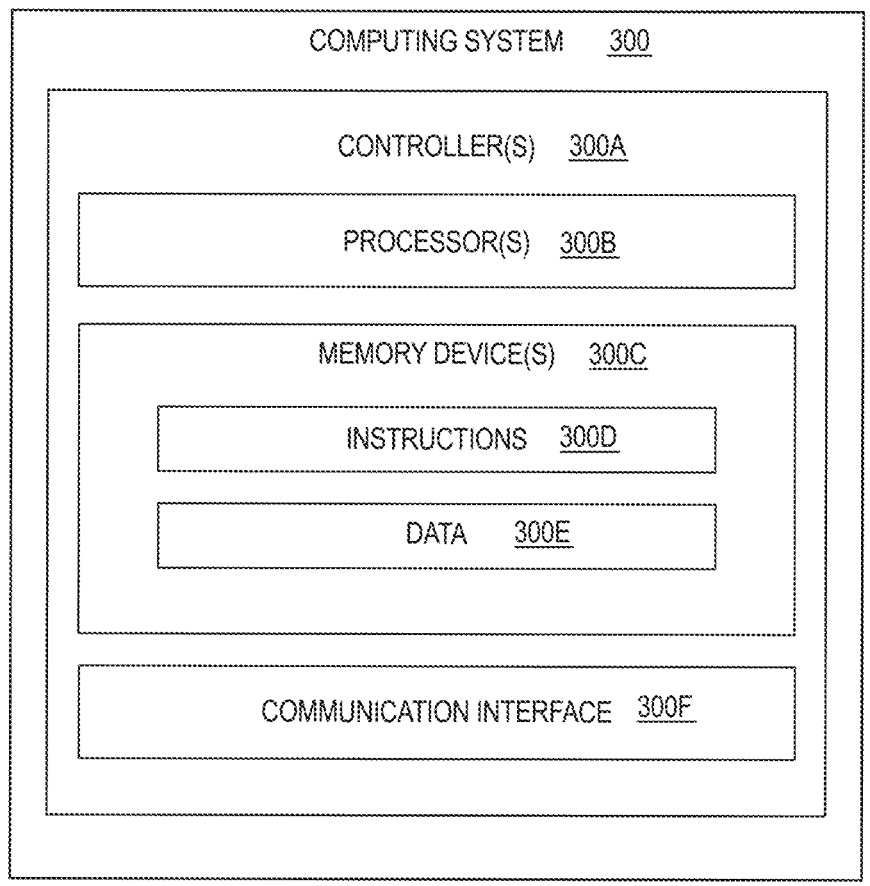
FIG. 15 is a computing system according to example aspects of the present disclosure.

FIG. 15 is a block diagram of the computing system 300 in accordance with various aspects of the present disclosure.

As shown in FIG. 15, the computing system 300 can include one or more processor(s) 300B and one or more memory device(s) 3000. The one or more processor(s) 300B and the one or more memory device(s) 3000 can be embodied in one or more controller(s) 300A. The one or more processor(s) 300B can include any suitable processing device, such as a microprocessor, microcontroller, integrated circuit, logic device, or other suitable processing device. The one or more memory device(s) 3000 can include one or more computer-readable medium, including, but not limited to, non-transitory computer-readable medium, RAM, ROM, hard drives, flash drives, and other memory devices.

The one or more memory device(s) 3000 can store information accessible by the one or more processor(s) 300B, including computer-readable instructions 300D or computer-readable program code that can be executed by the one or more processor(s) 300B. The instructions 300D can be any set of instructions that, when executed by the one or more processor(s) 300B, cause the one or more processor(s) 300B to perform operations. The instructions 300D can be software written in any suitable programming language or can be implemented in hardware. The memory device(s) 3000 can further store data 300E that can be accessed by the processor(s) 300B. For example, the data 300E can include any of the data noted herein. The data 300E can include one or more table(s), function(s), algorithm(s), model(s), equation(s), libraries, etc. according to example aspects of the present disclosure.

The computing system 300, or the controller(s) 300A thereof, can include a communication interface 300F used to communicate with the other components. The communication interface 300F can include any suitable components for interfacing with one or more network(s), including for example, transmitters, receivers, ports, controllers, antennas, or other suitable components.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s).

As will be appreciated by those of ordinary skill in the art without undue experimentation, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. An electric propulsor, comprising:
  a propeller having a hub and blades extending from the hub, the blades being movable along respective flapping axes between a deployed position and a stowed position;
  a motor coupled with the hub and arranged to rotatably drive the propeller;

an actuator;
  a clevis having opposing arms that each define complementary slots, wherein the actuator has a control arm that is received between the opposing arms and that has a pin slidably received within the complementary slots;
one or more processors; and
one or more non-transitory memory devices storing instructions, which, when executed by any combination of the one or more processors, causes the one or more processors to:
  receive an input indicating an azimuthal position of the blades;
  control the motor to align the blades with a target azimuthal position based at least in part on the input; and
  with the blades of the propeller arranged at the target azimuthal position, cause the actuator to translate a control rod coupled thereto and with the hub to actively fold or unfold the blades along the respective flapping axes of the blades.

2. The electric propulsor of claim 1, wherein the control rod includes the clevis.

3. The electric propulsor of claim 1, wherein, to move the blades to the stowed position, one or more processors are to:
  with the blades of the propeller arranged at the target azimuthal position, cause the control arm of the actuator to retract so that the pin engages respective ends of the complementary slots to pull the clevis toward an actuator housing of the actuator in which the control arm retracts to cause the blades to actively fold along the respective flapping axes to the stowed position.

4. The electric propulsor of claim 1, wherein, to move the blades from the stowed position to the deployed position, the one or more processors are to:
  with the blades of the propeller arranged at the target azimuthal position, cause the control arm of the actuator to extend so that the clevis is moved away from an actuator housing of the actuator from which the control arm extends to cause the blades to actively unfold along the respective flapping axes.

5. The electric propulsor of claim 4, wherein in causing the control arm of the actuator to extend so that the clevis is moved away from the actuator housing, the blades are actively unfolded along the respective flapping axes so that the blades reach a position in which the blades have respective negative coning angles, and wherein the one or more processors are to:
  cause rotation of the motor to move the blades from the position in which the blades have respective negative coning angles to the deployed position in which the blades reach an equilibrium position.

6. The electric propulsor of claim 5, wherein as the blades reach and operate in the equilibrium position, the actuator is not loaded during rotation of the blades.

7. The electric propulsor of claim 1, further comprising:
  a mounting frame coupling the electric propulsor with a vehicle structure, and
  wherein the target azimuthal position is an azimuthal position in which the blades, when folded or unfolded, do not contact the vehicle structure.

8. The electric propulsor of claim 1, further comprising:
  a mounting frame coupling the electric propulsor with a wing of an aircraft, the aircraft defining a longitudinal direction, and
  wherein, when the blades are in the stowed position, the blades overlap with the wing along the longitudinal direction.

9. An electric propulsor, comprising:
  a propeller having a hub and blades extending from the hub, the blades being movable along respective flapping axes between a deployed position and a stowed position;
  a motor coupled with the hub and arranged to rotatably drive the propeller;
an actuator;
  a clevis having opposing arms that each define complementary slots;
one or more processors;
one or more non-transitory memory devices storing instructions, which, when executed by any combination of the one or more processors, causes the one or more processors to:
  receive an input indicating an azimuthal position of the blades;
  control the motor to align the blades with a target azimuthal position based at least in part on the input; and
  with the blades of the propeller arranged at the target azimuthal position, cause the actuator to translate a control rod coupled thereto and with the hub to actively fold or unfold the blades along the respective flapping axes of the blades;
a mounting frame having a hinge coupling the actuator to the mounting frame; and
a clevis guide rail mounted to the mounting frame in which the clevis is translatable.

10. An electric propulsor, comprising:
  a propeller having a hub and blades extending from the hub, the blades being movable along respective flapping axes between a deployed position and a stowed position;
  a motor coupled with the hub and arranged to rotatably drive the propeller;
an actuator;
  one or more processors; and
  one or more non-transitory memory devices storing instructions, which, when executed by any combination of the one or more processors, causes the one or more processors to:
  receive an input indicating an azimuthal position of the blades;
  control the motor to align the blades with a target azimuthal position based at least in part on the input; and
  with the blades of the propeller arranged at the target azimuthal position, cause the actuator to translate a control rod coupled thereto and with the hub to actively fold or unfold the blades along the respective flapping axes of the blades, wherein the hub has a static spider and a sliding spider connected by linkages, the control rod is coupled with the sliding spider by a de-spinner that enables the sliding spider to rotate relative to the control rod, which is non-rotating, and wherein the sliding spider is translatable relative to the static spider by translation of the control rod so as to cause the blades to fold or unfold along the respective flapping axes.

11. The electric propulsor of claim 10, wherein the linkages include, for each one of the blades, a blade root linkage and a connector linkage, the blade root linkage arranged to hold one of the blades and is pivotably coupled with the static spider and coupled with the sliding spider by the connector linkage, and wherein the blade root linkages holding respective ones of the blades have hinges define the respective flapping axes of the blades.

12. The electric propulsor of claim 10, further including a clevis including opposing arms that each define complementary slots.

13. The electric propulsor of claim 12, wherein the actuator has a control arm that is received between the opposing arms and that has a pin slidably received within the complementary slots.

14. An electric propulsor, comprising:
a propeller having a hub and blades extending from the hub, the blades being movable along respective flapping axes between a deployed position and a stowed position;
a motor coupled with the hub and arranged to rotatably drive the propeller;
an actuator;
one or more processors; and
one or more non-transitory memory devices storing instructions, which, when executed by any combination of the one or more processors, causes the one or more processors to:
receive an input indicating an azimuthal position of the blades;
control the motor to align the blades with a target azimuthal position based at least in part on the input; and
with the blades of the propeller arranged at the target azimuthal position, cause the actuator to translate a control rod coupled thereto and with the hub to actively fold or unfold the blades along the respective flapping axes of the blades, wherein the control rod has a first end and a second end and extends through a hollow shaft of the motor, and wherein the first end is coupled with the hub on a first side of the motor and the second end is coupled with the actuator on a second side of the motor that is opposite the first side.

15. A method, comprising:
receiving an input indicating an azimuthal position of blades of a propeller;
aligning the blades with a target azimuthal position based at least in part on the input; and
with the blades of the propeller arranged at the target azimuthal position, causing an actuator to translate a control rod coupled thereto and with a hub of the propeller to actively fold or unfold the blades along respective flapping axes of the blades, wherein a clevis corresponding to the control rod includes opposing arms that each define complementary slots, and wherein the actuator has a control arm that is received between the opposing arms and that has a pin slidably received within the complementary slots.

16. The method of claim 15, wherein the control rod includes the clevis.

17. The method of claim 15, wherein actively folding the blades along respective flapping axes to a stowed position comprises:
with the blades of the propeller arranged at the target azimuthal position, retracting the control arm of the actuator so that the pin engages respective ends of the complementary slots to pull the clevis toward an actuator housing of the actuator in which the control arm retracts, which causes the blades to actively fold along the respective flapping axes to the stowed position.

18. The method of claim 15, wherein actively unfolding the blades along respective flapping axes comprises:
with the blades of the propeller arranged at the target azimuthal position, extending the control arm of the actuator so that the clevis is moved away from an actuator housing of the actuator from which the control arm extends, which causes the blades to actively unfold along the respective flapping axes.

19. The method of claim 18, wherein in extending the control arm of the actuator so that the clevis is moved away from the actuator housing, the blades are actively unfolded along the respective flapping axes so that the blades reach a position in which the blades have respective negative coning angles, and wherein the method further comprises:
rotating a motor coupled with the propeller to move the blades from the position in which the blades have respective negative coning angles to a deployed position in which the blades reach an equilibrium position.

20. A non-transitory computer readable medium storing instructions, which, when executed by any combination of one or more processors, causes the one or more processors to perform an operation, the operation comprising:
receiving an input indicating an azimuthal position of blades of a propeller;
controlling a motor coupled with the propeller to align the blades with a target azimuthal position based at least in part on the input; and
with the blades of the propeller arranged at the target azimuthal position, causing an actuator to translate a control rod coupled thereto and with a hub of the propeller to actively fold or unfold the blades along respective flapping axes of the blades, wherein a clevis corresponding to the control rod includes opposing arms that each define complementary slots, and wherein the actuator has a control arm that is received between the opposing arms and that has a pin slidably received within the complementary slots.

* * * * *